United States Patent
Hoffman et al.

(10) Patent No.: US 11,388,261 B2
(45) Date of Patent: *Jul. 12, 2022

(54) CROSS-DOMAIN BROKERING PROTOCOL CLOUD PROXY

(71) Applicant: Citrix Systems, Inc., Fort Lauderdale, FL (US)

(72) Inventors: Mark Hoffman, Boca Raton, FL (US); Jitendra Deshpande, Pompano Beach, FL (US); Sam Arun Seeniraj, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,410

(22) Filed: Aug. 3, 2021

(65) Prior Publication Data

US 2021/0377358 A1    Dec. 2, 2021

Related U.S. Application Data

(63) Continuation of application No. 16/545,192, filed on Aug. 20, 2019, now Pat. No. 11,115,489, which is a
(Continued)

(51) Int. Cl.
*H04L 67/562* (2022.01)
*H04L 67/10* (2022.01)
*G06F 9/54* (2006.01)

(52) U.S. Cl.
CPC .............. *H04L 67/562* (2022.05); *G06F 9/54* (2013.01); *H04L 67/10* (2013.01)

(58) Field of Classification Search
CPC .................................................. H04L 67/562
See application file for complete search history.

(56) References Cited

U.S. PATENT DOCUMENTS 6,996,716 B1 *  2/2006  Hsu .................. H04M 7/006
                                                        370/352
7,801,030 B1     9/2010  Aggarwal et al.
(Continued)

FOREIGN PATENT DOCUMENTS

GB          2356765 A        5/2001

OTHER PUBLICATIONS

Jun. 29, 2016—(PCT) International Search Report and Written Opinion—App PCT/US2016/031090.
(Continued)

*Primary Examiner* — Suraj M Joshi
(74) *Attorney, Agent, or Firm* — Banner & Witcott, Ltd.

(57) ABSTRACT

Aspects described herein provide improved system architectures for a cross-domain proxy so that server/controller software may be placed in a cloud-based environment, with only limited equipment required on-premises at a user location for use by application client software. Aspects described herein provide techniques for communicating information between disparate domains, while each party to the transaction believes it is on the same domain as the other party to the transaction. Aspects described herein generally relate to a method to transparently transport the Citrix Brokering Protocol (CBP, or other protocols) between On-Premises VDAs (e.g., virtualized Windows computers) to an In-Cloud Broker running on the Desktop Delivery Controllers (DDCs) when each resides in different domains. Using aspects described herein, resources that otherwise need to be co-located on the same administrative domain can be moved to different domains, e.g., using a cloud-based system architecture.

20 Claims, 9 Drawing Sheets

Related U.S. Application Data continuation of application No. 15/146,131, filed on May 4, 2016, now Pat. No. 10,432,746.

(60) Provisional application No. 62/158,598, filed on May 8, 2015.

(56) References Cited

U.S. PATENT DOCUMENTS

| | | |
|---|---|---|
| 2007/0088834 A1 | 4/2007 | Litovski et al. |
| 2014/0059108 A1 | 2/2014 | Borshack et al. |
| 2015/0052523 A1* | 2/2015 | Raghu ................. G06F 9/45533 718/1 |
| 2016/0132214 A1* | 5/2016 | Koushik ................... G06F 8/61 715/741 |

OTHER PUBLICATIONS

Dec. 29, 2017—(US) Non-final Office Action—U.S. Appl. No. 15/146,131.
Jul. 12, 2018—(US) Final Office Action—U.S. Appl. No. 15/146,131.
Oct. 1, 2018—(US) Non-final Office Action—U.S. Appl. No. 15/146,131.
May 23, 2019—(US) Notice of Allowance—U.S. Appl. No. 15/146,131.

\* cited by examiner

CROSS-DOMAIN BROKERING PROTOCOL CLOUD PROXY

CROSS-REFERENCE TO RELATED CASES

This application is a continuation of application Ser. No. 16/545,192, filed Aug. 20, 2019, which is a continuation of application Ser. No. 15/146,131, filed May 4, 2016, which claims priority to provisional application No. 62/158,598, filed May 8, 2015, having the same title, and which is herein incorporated by reference.

FIELD

Aspects described herein generally relate to a method to transparently transport the Citrix Brokering Protocol (CBP, or other protocols) between On-Premises VDAs (e.g., virtualized Windows computers) to an In-Cloud Broker running on the Desktop Delivery Controllers (DDCs) when each resides in different domains.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 7-9 shows illustrative source code that may be used to implement one or more features described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards improving upon prior art system architectures where all virtualized desktop applications (VDAs), desktop delivery controllers (DDCs), and the primary domain controller (PDC) are resident on-premises at a user's location. Because all resources are located at the user location, each user/location incurs significant cost associated with purchasing hardware and software resources, as well as employee time and salary to maintain the system. Aspects described herein provide improved system architectures for a cross-domain proxy so that the DDCs may be placed in a cloud-based environment, with only limited equipment required on-premises at a user location. Customers and users can realize significant cost savings by moving DDCs to a cloud-based system using economies of scale realized by cloud-architectures. However, because of inherent security measures enforced by each system's primary domain controller (PDC), the move is not as simple as just installing the software in a different location. Rather, each DDC and VDA expect to be installed on the same primary domain to ensure that necessary security measures are enforced. As a result, aspects described herein provide techniques for communicating information between disparate domains, while each party to the transaction believes it is on the same domain as the other party to the transaction.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
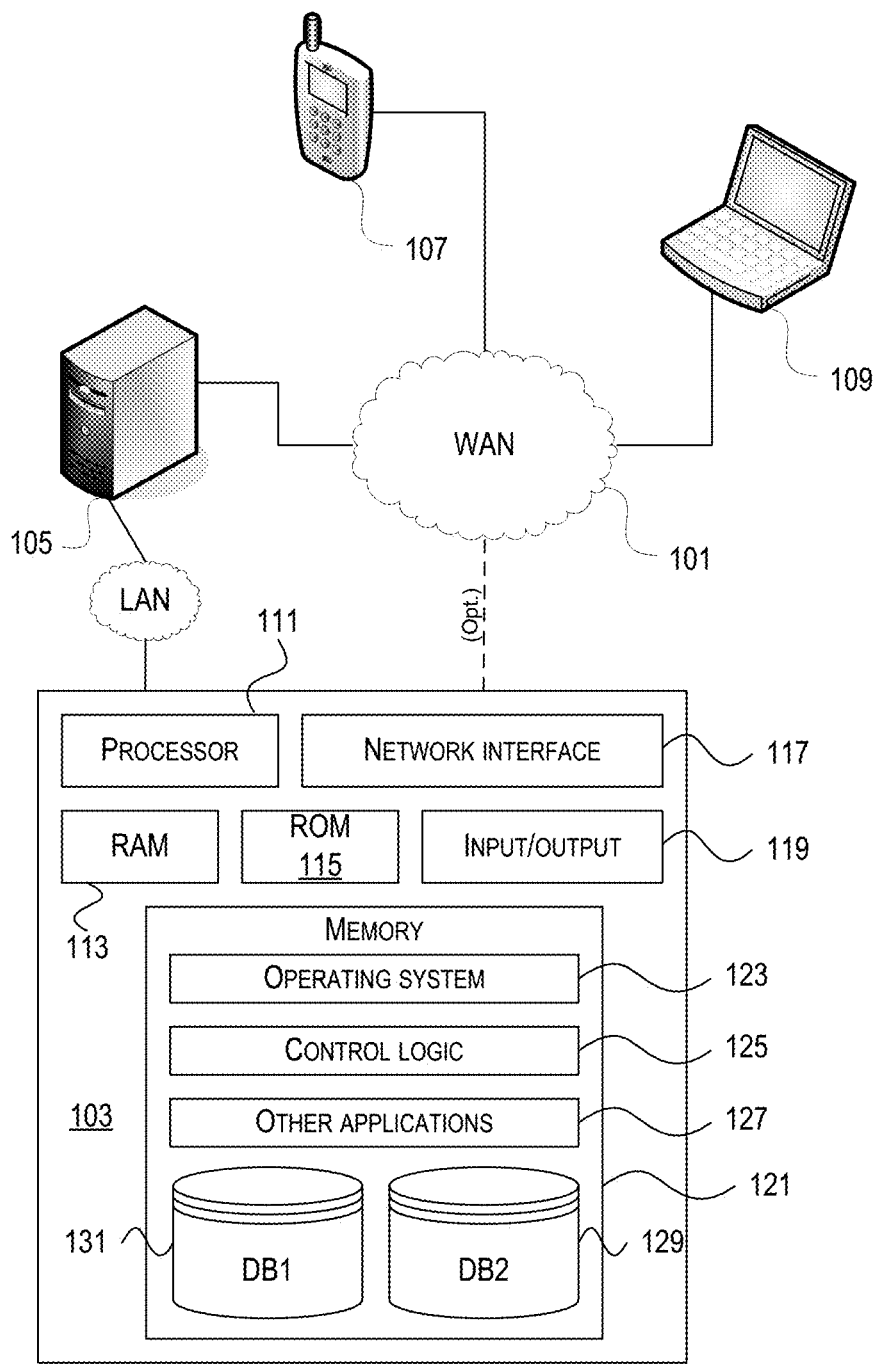
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
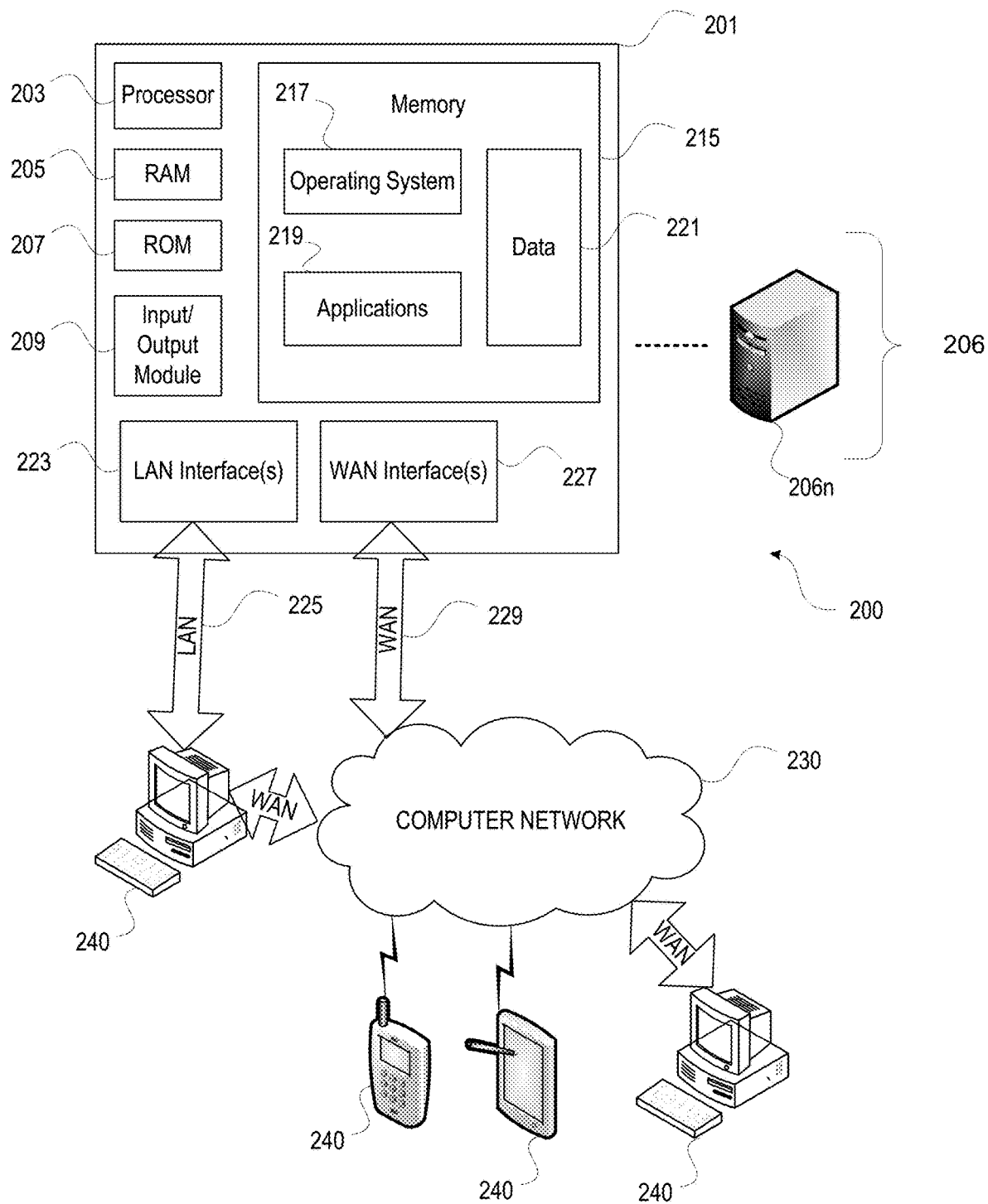
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206*a* in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
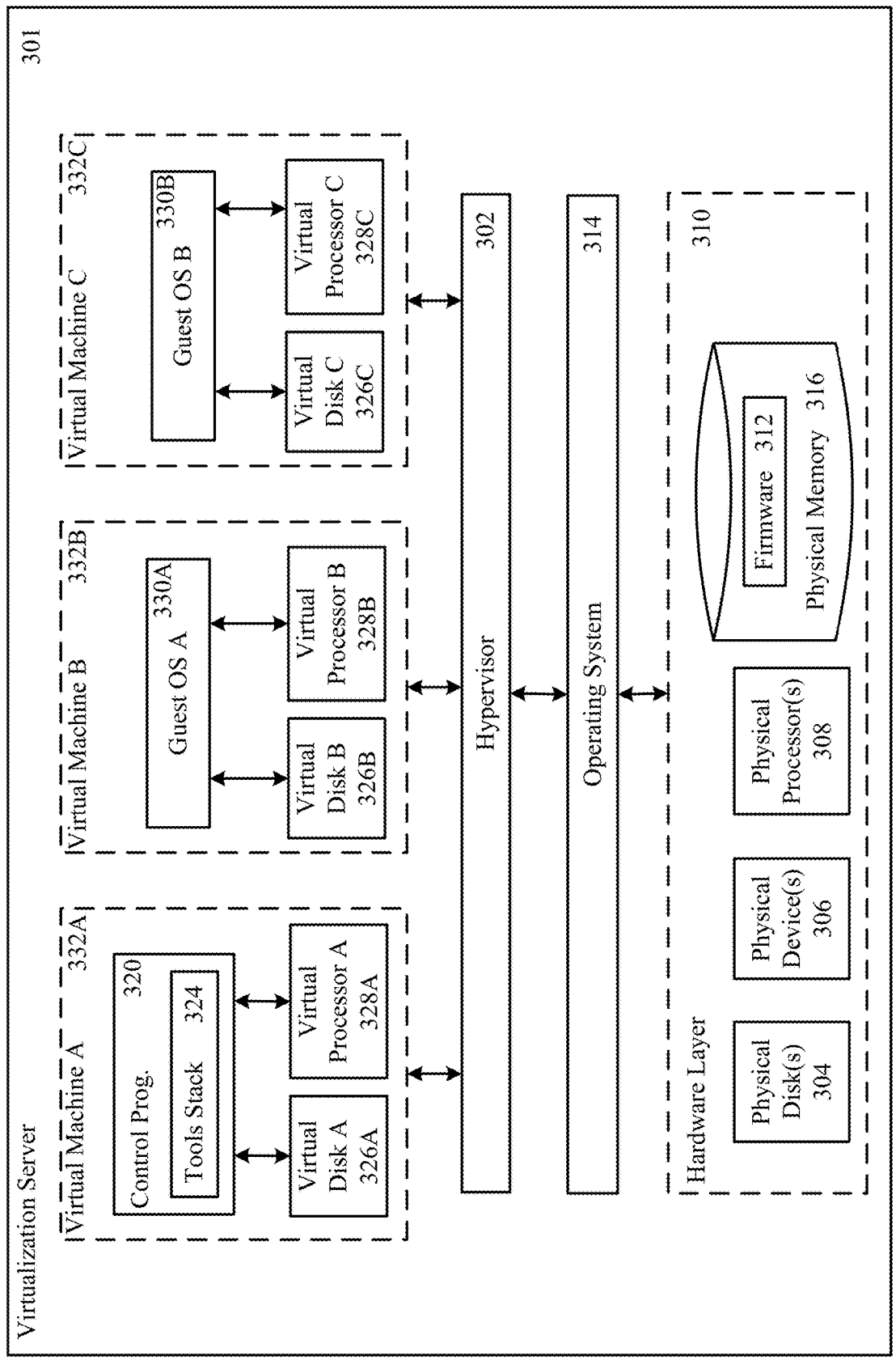
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
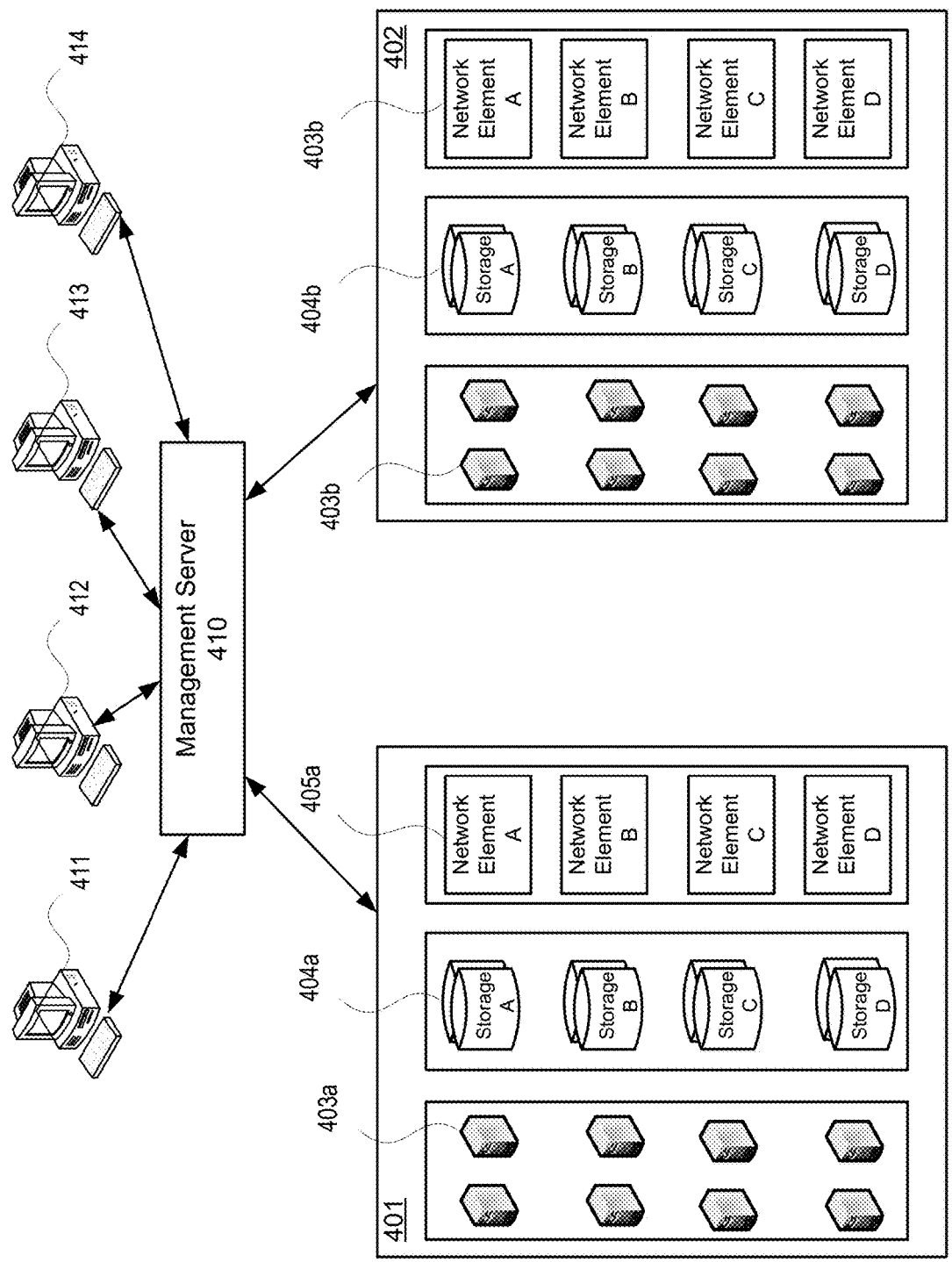
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Cross-Domain Proxy Architecture

Figure 5:
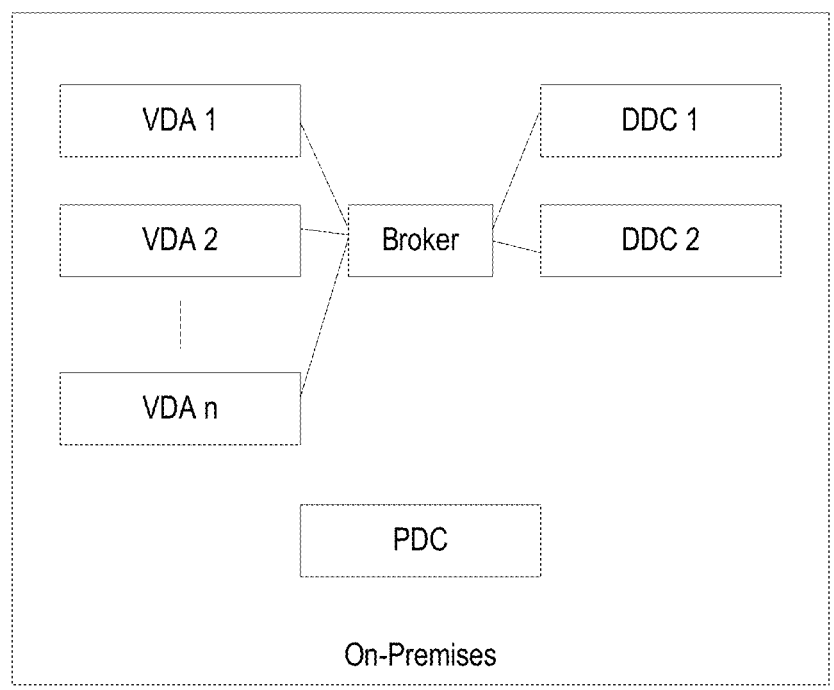
FIG. 5 shows a conventional system architecture of a prior art system.

FIG. 5 illustrates a prior art system architecture where all virtualized desktop applications (VDAs), desktop delivery controllers (DDCs), and the primary domain controller (PDC) are all resident on-premises at a user's location. Because all resources are located at the user location, each user incurs significant cost associated with purchasing hardware and software resources, as well as employee time and salary to maintain the system.

Figure 6:
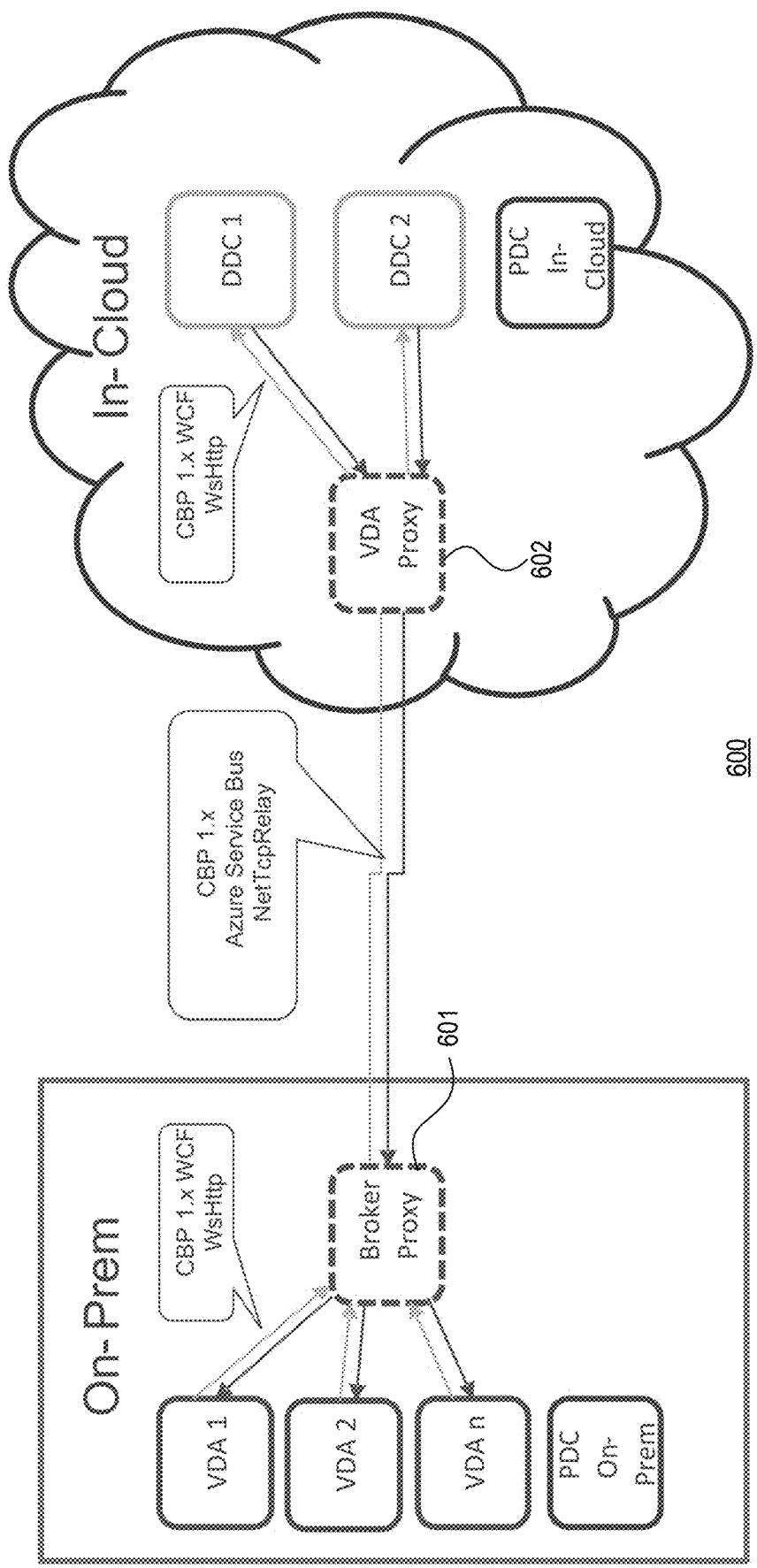
FIG. 6 shows an illustrative system architecture according to one or more aspects described herein.

FIG. 6 depicts an illustrative system architecture for a cross-domain proxy according to one or more illustrative aspects described herein. In the system architecture 600 of FIG. 6, the DDCs may be placed in a cloud-based environment, e.g., as illustrated with respect to FIG. 4. Customers and users can realize significant cost savings by moving DDCs to a cloud-based system using economies of scale realized by cloud-architectures. However, because of inherent security measures enforced by each system's primary domain controller (PDC), the move is not as simple as just installing the software in a different location. Rather, each DDC and VDA expect to be installed on the same primary domain to ensure that necessary security measures are enforced. As a result, aspects described herein provide techniques for communicating information between domains, while each party to the transaction believes it is on the same domain as the other party to the transaction.

Aspects described herein adhere to the following limitations or restrictions. The base brokering protocol should not be modified, so that the same protocol can be used regardless of whether the system architecture is as shown in FIG. 5 or FIG. 6. The VDAs and the broker database should not be modified for the same reason. There should be minimal impact on the broker, and preferably no impact on the broker core logic. The solution should account for the fact that Windows Communication Foundation (WCF) Kerberos authentication does not work when VDAs and brokers are in separate domains, nor do VDA and broker IP addresses because each expects a local domain IP address. In order to maintain proper security measures, both the on-premises and in-cloud domains should communicate without using an external public IP address (e.g., to prevent third-party attacks). A protocol or other communication technique that is dependent on each party to a transaction being resident within the same domain is referred to herein as an intra-domain protocol or intra-domain communication. A protocol that communicates between two different domains is said to be an inter-domain protocol or communication.

As a general introduction to a more detailed description that follows, the system architecture of FIG. 6 allows users to save costs and resources while making the VDAs perceive the broker as being on-premises, and the broker perceives the VDAs as being "in the cloud." As a result, each perceives the other as local to itself, through the use of a proxy module at each location.

The broker proxy 601 may be installed on a dedicated Windows machine on a customer premises. Broker proxy 601 exposes the broker's WCF controller interface through which each VDA communicates. Each VDA is directed to the broker proxy 601, and sends all WCF calls to broker proxy 601. Because both the broker proxy 601 and each VDA 602 are located in the same domain, the WCF Kerberos authentication works without further modification. The broker proxy may also authenticate VDA WCF incoming calls, e.g., using the same test as the actual Broker (DDC) performs. The broker proxy may also change broker supplied WCF Endpoints to reference the Broker Proxy instead of the Broker (e.g., ITicketing, INotify). The broker proxy will reconstruct calls from the VDA Proxy for calls to an actual VDA.

The broker proxy may also optimize registration by performing the Test call locally. Registration proceeds when the Test succeeds. Registration is stopped when the Test fails. This eliminates the need for a Test call over Azure Service Bus (ASB) or other custom transport (e.g., a long distance transport service providing enhanced speed and security, which can mock CBP and related information, and that does not require the opening of firewall ports).

The VDA proxy 602 may be installed on a machine at the cloud location, e.g., the same machine as the broker(s), in order to reduce cost. Each DDC may incorporate a brokering management module as well as other service modules (e.g., licensing, provisioning, storefront). VDA proxy 602 exposes the VDA's WCF worker interface allowing the broker to directly communicate with it. VDA Proxy 602 may also perform load balancing when communicating with multiple brokers (DDCs), e.g., during registration. Because both the VDA proxy 602 and each of the brokers are in the same domain, WCF Kerberos authentication works on this side as well. Other types of authentication may be used based on the type of authentication in use. The VDA proxy may also discover DDCs via the registry ListOfDDCs (same as may be used by the VDA). The VDA proxy may route WCF calls to the correct DDC (notifications, validate connection . . . ), maintain a dictionary or database of registered VDAs and Registered DDCs, maintain a record of Last Heartbeat timestamp(s), authenticate DDC WCF incoming calls (must originate from known DDC), forwards VDA metadata to Broker Proxy, reconstructs calls from Broker Proxy for calls to a broker, and optimizes registration by always returning success for the Test call.

Broker proxy 601 and VDA proxy 602 act as forwarding agents for the protocol in use between the VDAs and the DDCs. In one embodiment, Citrix Brokering Protocol (CBP) may be used. A similar architecture and aspects described herein are also usable with other protocols and systems. A single Microsoft Azure Service Bus (ASB) may be used for communications between different domains, because ASB does not require Kerberos authentication nor external IP addresses or a custom transport also not requiring Kerberos authentication. Each VDA makes brokering calls (e.g., using the brokering protocol in use) to broker proxy 601 via WCF, which forwards the calls over ASB or custom transport to VDA proxy 602, which in turn forwards the calls via WCF to the broker/DDC. The VDA is unaware of the hops from its local on-premises domain to the broker's in-cloud domain.

VDA calls to the broker may be routed to a randomly selected broker when the VDA call is for initial registration according to the protocol in use. The registration process may inform the broker of the VDA's WCF endpoints including the VDA's on-premises IP address, which are saved in the broker database. VDA calls may be routed to the broker with which the VDA is registered for all other calls according to the protocol in use. Alternatively, in order to provide High Availability service, successive calls may be routed to a randomly selected DDC as is done for registration.

The broker responds by making its own calls to VDA proxy 602 via WCF, which forwards the calls over ASB back to broker proxy 601, which in turn forwards the calls via WCF to the applicable VDA. The broker is unaware of the hops from its local in-cloud domain to the VDA's on-premises domain. Broker calls may be made only to registered VDAs identifying the VDA using an IP address. Because the IP address is not valid in the in-cloud domain, the IP address and related contract information (e.g., WCF bindings, contract name, etc.) may be packaged in the WCF transport header as metadata or similar metadata feature of the custom transport. This metadata is forwarded by VDA proxy 602 to broker proxy 601, which extracts the metadata, rebuilds the WCF call from the provided IP address and contract information, and calls the VDA via WCF on-premises. The original protocol request and replies are transported unchanged, and all protocol calls can remain synchronous by following a standard request-reply model.

Using aspects described herein, multiple VDAs can communicate to multiple DDCs over a single Azure Service Bus (ASB) or custom transport. Load balancing can be performed in the system, whereas VDAs individually handled load balancing previously. Each VDA is able to select a DDC even when it cannot directly communicate with it. Load balancing may be performed by the Azure Service Bus or custom transport between multiple VDA proxies.

According to an illustrative aspect, a WCF endpoint and related info (as metadata) are added to the message header using the WCF OperationalContextScope feature or similar metadata feature of the custom transport. The original protocol request is transported with additional metadata across the ASB or custom transport. The receiving proxy on the other end uses the metadata to reconstruct the actual endpoint, and call the actual endpoint at that location.

Figure 7:
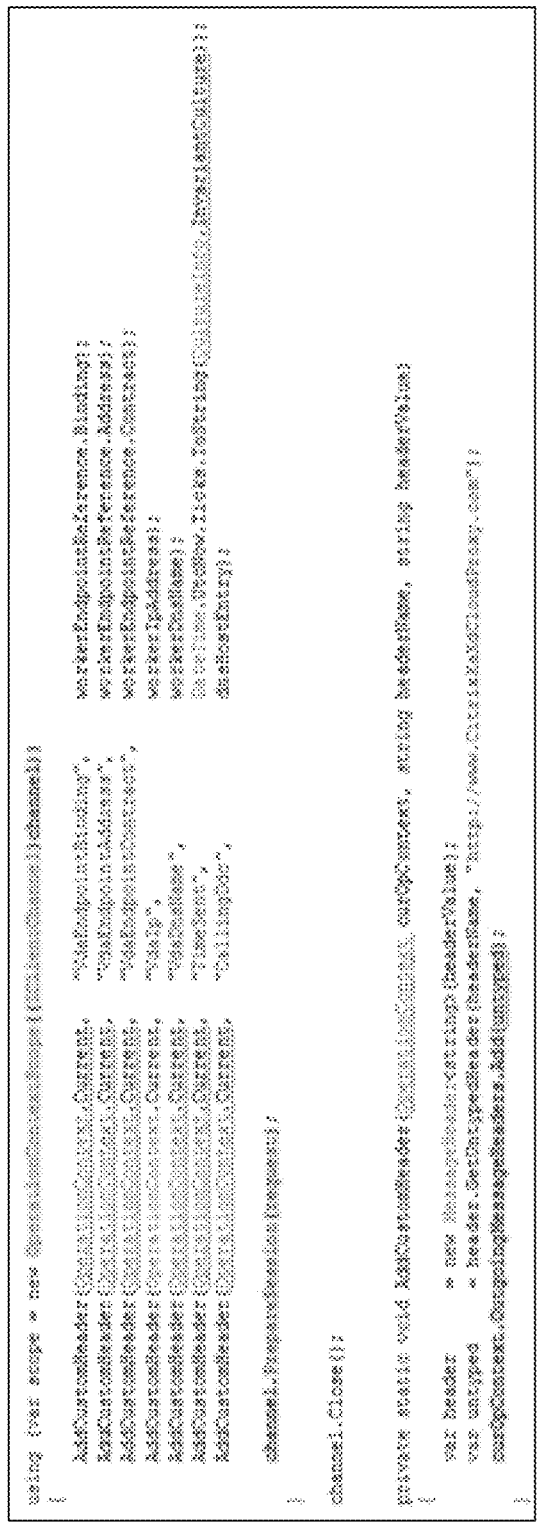

An OperationalContextScope Send-Sample is reproduced in FIG. 7. FIG. 7 represents a request from the Broker to the VDA to prepare for a new connection to the VDA from a client. The first three added header values are the 3 pieces of WCF contract information (address, binding, and contract). The next is the actual VDA IP address, the VDA DNS name and the following values are for tracing/debugging. A custom transport sends the same metadata using its own custom method.

Figures 8, 9:
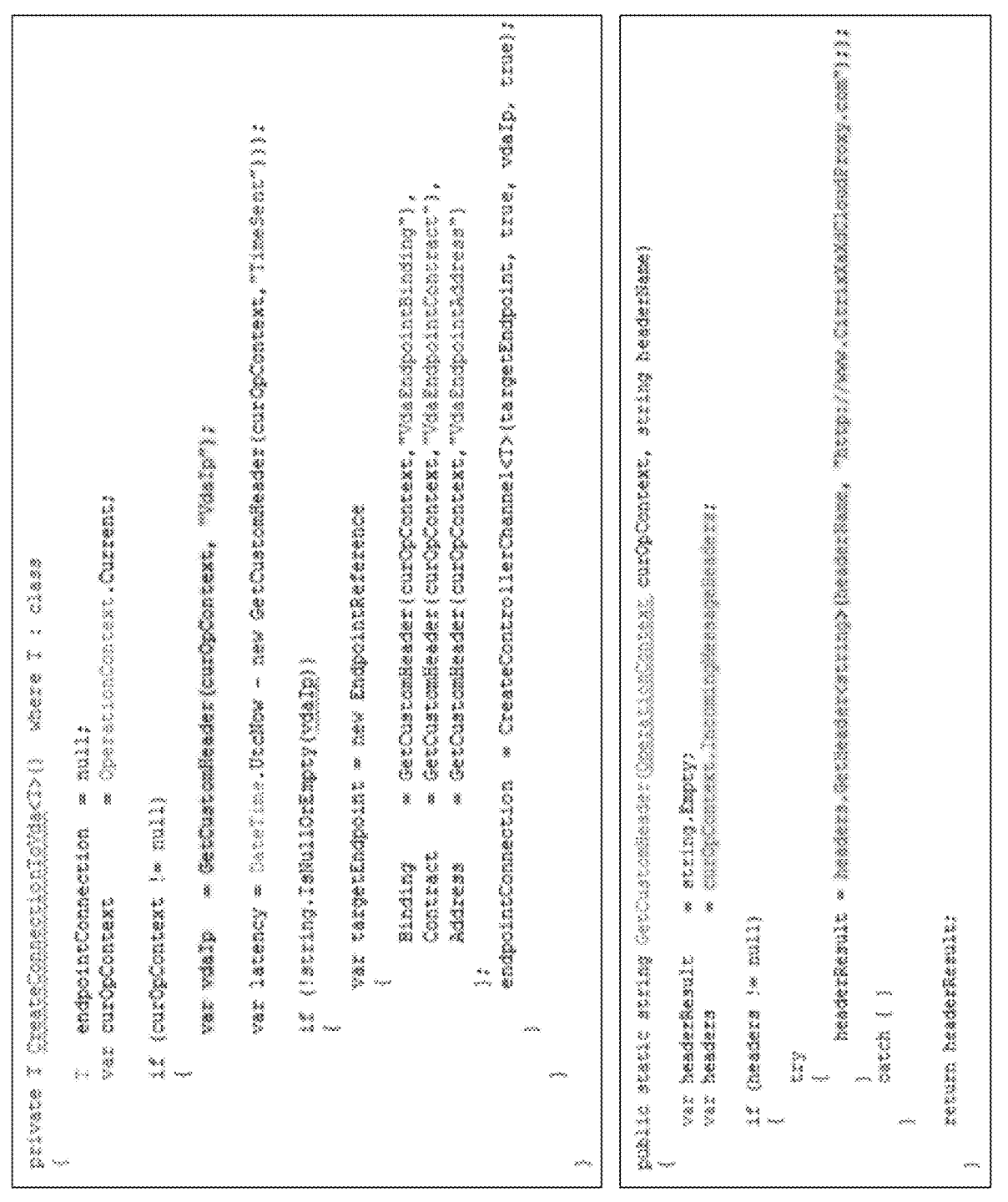

An OperationalContext Receive-Sample: part A, is reproduced in FIG. 8. FIG. 8 represents the Broker Proxy receiving a call from the cloud. The broker proxy extracts the WCF binding, address and contract information so the broker proxy can reconstruct the new endpoint to the VDA. The broker proxy finishes by creating the actual WCF channel to the VDA.

An OperationalContext Receive-Sample: part B, is reproduced in FIG. 9, showing how the metadata is extracted from the WCF header. A custom transport may use its own method to extract the same metadata.

When sending messages from a broker to the VDA proxy, and then to the broker proxy, the following metadata may be included in each message header from the VDA proxy to the broker proxy: 1) VDA Endpoint Binding, Used to create VDA WCF connection; 2) VDA Endpoint Address—Used to create VDA WCF connection; 3) VDA Endpoint Contract—Used to create VDA WCF connection; 4) VDA IP Address—Used to create VDA WCF connection; 5) VDA DNS Name—Used in tracing; 6) Time Sent—Used to calculate one-way ASB latency; 7) Calling DDC DNS name—Used in tracing.

When sending messages from a VDA to the broker proxy, and then to the VDA proxy, the following metadata may be included in the head of each message from the broker proxy to the VDA proxy: 1) VDA SID—Used for Broker VDA Authentication; 2) VDA IP—Used to create VDA WCF connection; 3) VDA To—DDC target endpoint, used to rebuild actual DDC endpoint; 4) Time Sent—Used to calculate one-way ASB latency; 5) Proxy Instance ID—Reserved for future use.

When each VDA communicates with the broker proxy, no code or binary changes are made to use RTM VDA. The VDA ListOfDDCs points to On-Prem Broker Proxy(s). In addition, the Farm-GUID site discovery might not be supported. That is, Farm-GUID is a legacy site-discovery method and is not commonly used (but could be if desired). Auto-List-Of-DDCs is a more robust site-discovery method that improves the registration process. With the current development of multi-geo support the Auto-List-Of-DDCs method is preferred, but not exclusive.

Existing broker core login may be changed as follows, or in a similar manner to achieve a similar result:
a. Created MEF loaded WCF Factory Class
b. Core functions (current functionality), loaded by default
c. Proxy functions, loaded by app.config file appSettings value
d. Refactored explicit WCF Close and Abort calls to WCF Factory Class methods
e. Provides method to cleanly wrap Operational Context Scope around existing WCF calls to the VDA
f. Refactored Authentication calls to WCF Factory Class for necessary customization
g. AuthenticateWorkerSid from Registrar.cs
h. AuthenticateUserSid from NotifyBroker.cs
i. All WCF related functions are now in WCF Factory class and not spread throughout the Broker
j. The core Broker function is unaware of the proxy's presence
k. Proxy WCF Factory Class calls the Core WCF Factory Class; channel creation functions are not duplicated According to an illustrative aspect, the VDA proxy and broker proxy both implement Worker and Controller Interfaces. WCF binding type may be controlled via a config file. wsHttpBinding may be provided for Proxy to Broker and Broker Agent. netTcpRelayBinding (ASB) or a custom transport may be provided for Proxy to Proxy communications. Proxy differentiation is in how WCF calls are forwarded. As a result, there is one light-weight service with a 'personality' forwarding plugin controlled by a VDA or Broker Proxy unique app.config file. One service means one MSI; install parameter determines Proxy Type. Logging may be done via a diagnostics facility, e.g., Citrix Diagnostic Facility (CDF).

Figure 10:
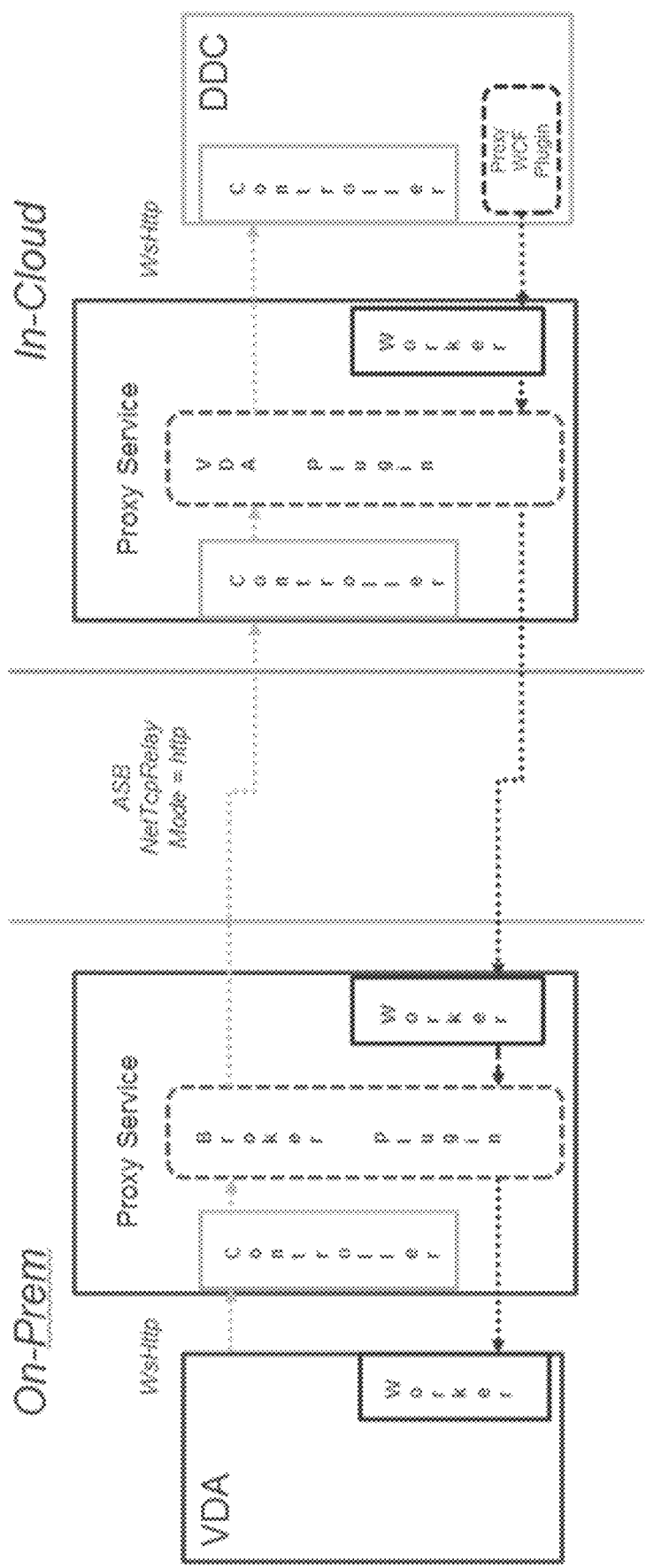
FIG. 10 illustrates a detailed view of a portion of the architecture shown in FIG. 6.

FIG. 10 illustrates a detailed schematic of a portion of the proxy architecture depicted in FIG. 6.

Various authorizations may be used by the proxy modules. The broker proxy verifies a caller is a valid VDA by comparing the VDA SID (security ID) in the Request's Connection ID with SID in the WCF operational context (same test as the actual broker would perform). The VDA Proxy verifies each caller is a valid DDC by comparing the SID derived from ListOfDDCs with the SID in the WCF operational context (same test as Broker Agent performs). Each broker may also verify that a caller is the other proxy by comparing the SID derived from ListOfProxies with SID in the WCF operational context. Each broker also repeats VDA SID test for confirmation.

According to an illustrative aspect, a heartbeat message is sent from Broker (DDC) to VDA proxy. A first heartbeat may be sent after 5 seconds, and successive heartbeats every 5 minutes. The heartbeat sends Broker Proxies API metrics, and may be used to detect ASB or custom transport failure. The VDA Proxy logs Broker Proxy API metrics and its own VDA API metrics. The heartbeat procedures may use ICloudCommunincation or similar interface.

The following API metrics may be maintained and analyzed to ensure the health and integrity of the proxy system. The metrics provide performance times for each call type and the overall proxy. These metrics identify performance issues and Azure Service Bus issues and failures. The use of metrics is not required. However, without metrics it is difficult to identify proxy communication issues other than a complete failure.

For each protocol call received from the Broker or VDA, the following metrics may be tracked/monitored:
a. Total number of calls
b. Total number of aborts
c. Total number of fails
d. Total number of Reply fails
e. Total Round-trip time
f. Minimum Time
g. Maximum Time
h. Average Time
i. Same metrics recorded for overall Proxy According to another illustrative aspect, unique proxy ASB endpoints may be used. In addition, an XML services plugin may be used as a generic http/https listener and forwarder, which may use reflection to discover XML handlers such as STA and NFuse. The STA handler may be a simple forwarder. The Nfuse handler may implement encrypted password features to extend the Nfuse Request-Address to send encrypted password and hashed ticket.

Using aspects described herein, resources that otherwise need to be co-located on the same administrative domain can be moved to disparate locations, e.g., using a cloud-based system architecture. Protocol conversion may be performed when the two sites use different brokering protocols.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:
1. A computing device comprising:
one or more processors; and
memory storing instructions that, when executed by the one or more processors, cause the computing device to:
receive, from one or more of a plurality of virtual desktop application (VDA) proxy modules, metrics associated with a health of an intra-domain protocol;
receive, from one or more VDAs in a first domain, a request for broker services, wherein the broker services are associated with one or more desktop delivery controllers (DDCs) in a second domain different from the first domain;

determine, based on the metrics, a first VDA proxy module of the plurality of VDA proxy modules; and send, to the first VDA proxy module, the request for broker services, wherein the first VDA proxy module is configured to transmit, via the second domain, the request to the one or more DDCs.

2. The computing device of claim 1, wherein the metrics indicate a total round-trip time associated with the intra-domain protocol.

3. The computing device of claim 1, wherein the metrics indicate a total number of calls made via the intra-domain protocol.

4. The computing device of claim 1, wherein the metrics indicate a failure of an interface of the intra-domain protocol.

5. The computing device of claim 1, wherein the first VDA proxy module executes on the computing device.

6. The computing device of claim 1, wherein the first VDA proxy module executes on a second physical computing device.

7. The computing device of claim 1, wherein the intra-domain protocol is Citrix Brokering Protocol (CBP) over WCF Kerberos.

8. A method comprising:
receiving, by a computing device and from one or more of a plurality of virtual desktop application (VDA) proxy modules, metrics associated with a health of an intra-domain protocol;

receiving, from one or more VDAs in a first domain, a request for broker services, wherein the broker services are associated with one or more desktop delivery controllers (DDCs) in a second domain different from the first domain;

determining, based on the metrics, a first VDA proxy module of the plurality of VDA proxy modules; and sending, to the first VDA proxy module, the request for broker services, wherein the first VDA proxy module is configured to transmit, via the second domain, the request to the one or more DDCs.

9. The method of claim 8, wherein the metrics indicate a total round-trip time associated with the intra-domain protocol.

10. The method of claim 8, wherein the metrics indicate a total number of calls made via the intra-domain protocol.

11. The method of claim 8, wherein the metrics indicate a failure of an interface of the intra-domain protocol.

12. The method of claim 8, wherein the first VDA proxy module executes on the computing device.

13. The method of claim 8, wherein the first VDA proxy module executes on a second physical computing device.

14. The method of claim 8, wherein the intra-domain protocol is Citrix Brokering Protocol (CBP) over WCF Kerberos.

15. A method comprising:
receiving, by a broker proxy module hosted within a customer domain and from a virtual desktop application (VDA) proxy module hosted within one or more service provider domains, metrics associated with a health of an intra-domain protocol; and sending, based on the metrics and to the VDA proxy module, a request for broker services, wherein the broker services are associated with one or more desktop delivery controllers (DDCs) executing on a second physical computing device and hosted within the one or more service provider domains, and wherein the VDA proxy module is configured to transmit the request to the one or more DDCs as if a VDA associated with the request and the one or more DDCs were hosted within a single domain.

16. The method of claim 15, wherein the metrics indicate a total round-trip time associated with the intra-domain protocol.

17. The method of claim 15, wherein the metrics indicate a total number of calls made via the intra-domain protocol.

18. The method of claim 15, wherein the metrics indicate a failure of an interface of the intra-domain protocol.

19. The method of claim 15, wherein the broker proxy module executes on a first physical computing device, and wherein the VDA executes on the first physical computing device.

20. The method of claim 15, wherein the VDA proxy module executes on the second physical computing device.

* * * * *